Feb. 12, 1957
W. R. CARGLE
2,781,443
VEHICLE YIELDABLE LIGHT MOUNTING
Filed Feb. 19, 1954
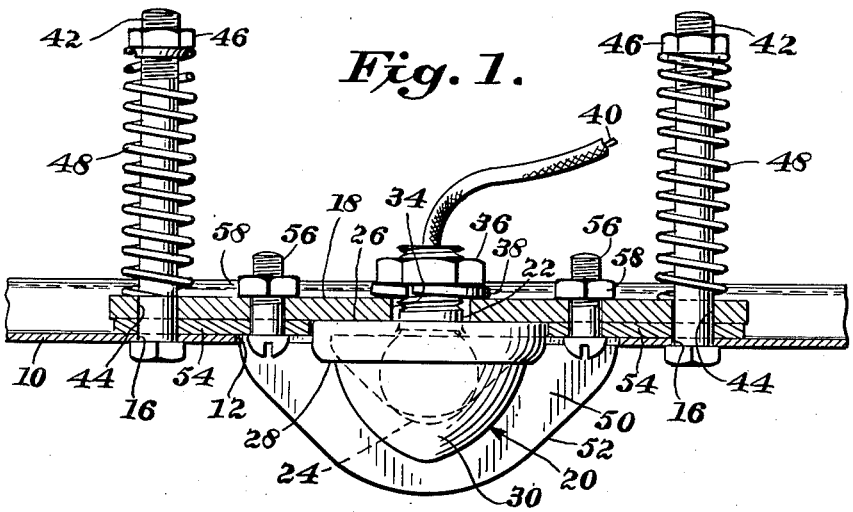
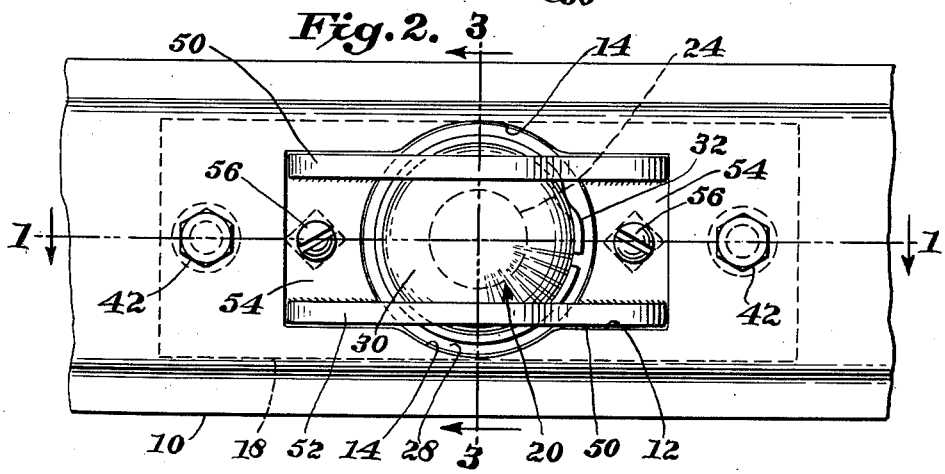
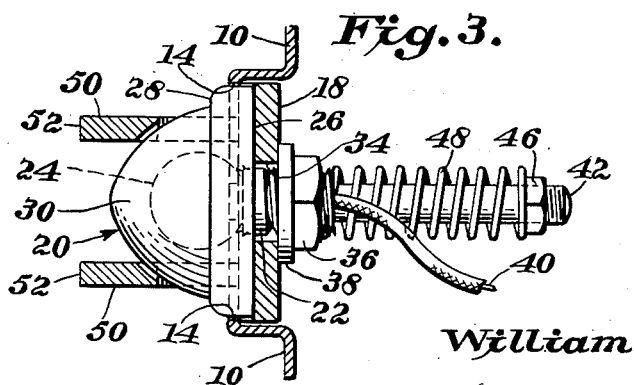
INVENTOR:
William R. Cargle,
BY Cushman, Darby & Cushman
ATTORNEYS.

United States Patent Office 2,781,443
Patented Feb. 12, 1957

2,781,443

VEHICLE YIELDABLE LIGHT MOUNTING

William R. Cargle, Victoria, Tex.

Application February 19, 1954, Serial No. 411,333

3 Claims. (Cl. 240—8.2)

This invention relates to running lights for vehicles, and more particularly pertains to mountings for side and tail lights of trucks and trailers.

The cargo bodies of present-day trucks and trailers usually have substantially-upright side and rear walls that are disposed beyond the vehicle wheels. Running and signal lights for trucks and trailers usually are mounted exteriorly on the side and rear walls of their bodies, and project outwardly of such walls for adequate visibility of the lights. Although in many instances such projecting lights are protected by guard members, the side lights are frequently torn off by brushing against an object, e. g., another vehicle or the side of a building when a truck or trailer is being manuvered in a narrow alley. Projecting tail lights also are frequently damaged and sometimes even completely crushed when a truck or trailer is backed into a parking place and the light encounters an immovable obstacle, such as a building wall, a loading platform, or the like.

Although such lights can be adequately protected by being mounted in a wall recess, a recessed mounting will not, in many instances, provide adequate visibility for the light. Additionally, the provision of light protective recesses is an added expense in the manufacture of trucks and trailers and necessitates special dies, jigs, etc.

Accordingly, it is an object of this invention to provide a yieldable mounting for side and tail lights of trucks, trailers, and like vehicles which will preclude damage to the light upon its encountering a rigid obstacle.

It is another object of this invention to provide a yieldable light mounting of the type under consideration that is inexpensive, both from the standpoint of manufacture and installation.

It is another object of this invention to provide a yieldable light mounting of the type under consideration which can be quickly and easily installed on a vehicle.

Other objects and advantages of the invention will be apparent from the following description and accompanying drawings, in which:

Figure 1 is a horizontal sectional view through a vehicle light mounting embodying this invention showing the installation of the same on a vehicle and taken substantially on lines 1—1 of Figure 2.

Figure 2 is a front elevational view of the light mounting shown in Figure 1.

Figure 3 is a vertical sectional view taken on lines 3—3 of Figure 2.

Referring now to the drawings, there is shown a portion of an upright side or end wall 10 of a vehicle body. Since the construction is common, the wall portion is shown as being a channel, which is a conventional configuration for lower side and end frame members of a truck or trailer body. The wall 10 has a substantially-rectangular horizontally-elongated opening 12 cut therein at a desired location for a light, the upper and lower edges of such opening having substantially-arcuate recesses 14 (Figure 2) therein for reasons later explained. Somewhat beyond the opposite ends of the opening 12, the wall 10 is provided with a pair of circular apertures or bolt holes 16.

A generally-rectangular plate 18, of somewhat greater dimensions than the opening 12 in the wall 10, covers the opening 12 from the inner side of the wall, with the edge portions of the plate 18 extending beyond the edges of the opening 12. The plate 18 serves as a mounting for a conventional electric light 20 having a receptacle 22 for the usual incandescent lamp 24. A circular disc 26 is secured coaxially to the receptacle 22 and has an inturned peripherial flange 28 to form a socketed holder which receives the marginal edges of a generally-hemispherical lens or cover 30 for the lamp 24. The lens 30 is held in place in the holder by an ordinary split ring 32. The diameter of the lens holder is greater than the end height of the wall opening 12. Hence, the recesses 14 are provided to accommodate the holder. The receptacle 22 extends through a central opening 34 in the mounting plate 18 and is exteriorly threaded for engagement with a nut 36 for securement of the light 20 to the plate 18. Preferably, a lock washer 38 is interposed between the nut 36 and the plate 18. The usual insulated electric conductor 40 extends rearwardly from the receptacle 22 for connection to a source of power for the lamp 24.

Extending inwardly through the bolt holes 16 in the vehicle wall 10 are two headed bolts 42 which loosely project through and beyond registering openings 44 in the plate 18 and have nuts 46 threaded onto their inner ends. Mounted on each bolt 42 and bearing against the corresponding nut 46 and the inner side or face of the mounting plate 18 is a coil compression spring 48. These springs 48 serve to retain the mounting plate 18 firmly pressed against the inner side of the vehicle wall 10, so that the light 20 projects through the opening 12 and beyond the wall 10, but it will be seen that the springs will yield under sufficient force to permit the light to be pushed back into the vehicle body.

Two vertically-spaced substantially-horizontal V-shaped guard members 50 extend substantially parallel to the upper and lower edges of the wall opening 12, with the ends of each member 50 being secured to the mounting plate 18. The dimensions of these guard members 50 are such that they are movable with the plate 18 inwardly of the vehicle wall 10, but normally project outwardly through the wall opening 12 to serve as guards for the vehicle light 20. In this connection, it will be noted that the outer peripheral edges 52 of the guard members 50 are disposed outwardly beyond the horizontal outline of the light 20, and also that the guard members are spaced apart a distance somewhat less than the diameter of the light, to partially enclose the same without obstructing the visibility of the light from the exterior of the vehicle.

For convenience in manufacture and for mounting purposes, each pair of adjacent ends of the two guard members 50 is secured, as by welding, to a plate-like connecting member 54 which is fastened, as by a bolt 56 and a nut 58, to the mounting plate 18. The connecting member 54 may also be of extended area so that it extends to the corresponding end of the mounting plate 18 and has an oversized aperture therein for loose reception of the corresponding bolt 42.

From the foregoing construction, it will be seen that, when the light mounting is located on the side of a truck or trailer body, if the guard members 50 are struck by a passing vehicle or object, a camming action will occur between the inclined legs of the guard members and the object that will cause the springs 48 to yield and permit the light 20 and its guards 50 to move back into the vehicle body, to thus preclude the light from being damaged or torn off. Similarly, when the light mounting is located on the rear end of a vehicle, if the latter is backed into a wall or other obstruction which is contacted by the guard members 50, the springs 48 will similarly yield and permit the entire light 20 and its guard members to be deflected sufficiently within the vehicle body to preclude any damage to the light and its guard assembly.

It thus will be seen that the objects of this invention have been fully and effectively accomplished. It will be realized, however, that the specific embodiment described and shown for the purpose of illustrating the principles of this invention is subject to change without departure from such principles. Therefore, this invention includes all modifications encompassed within the spirit and scope of the following claims.

I claim:

1. In a vehicle having an exterior electric light attached to a substantially-vertical wall thereof, the combination of a yieldable mounting for the light comprising: means defining a scuttle opening in the vehicle wall; a plate interiorly covering said opening and overlapping the marginal edges thereof, said plate having means for mounting the light thereon with the latter projecting through said opening, and having a pair of guiding apertures on opposite sides of said light mounting means; a pair of rods attached to the wall on opposite sides of said opening and extending inwardly of the wall and loosely through said guiding apertures in said plate; an abutment on each said rod; and a coil compression spring bearing against each said abutment and the inner side of said plate.

2. The structure defined in claim 1 in which the rods comprise headed bolts extending inwardly through bolt holes in the vehicle wall and the abutments comprise nuts.

3. The structure defined in claim 1 in which the scuttle opening is larger than the light and including a pair of vertically-spaced generally V-shaped horizontal guard members secured to the plate and projecting through said opening and beyond the wall to partially enclose the light, the outer peripheral edge of said members extending beyond the horizontal periphral outline of the light.

References Cited in the file of this patent

UNITED STATES PATENTS

| | | |
|---|---|---|
| 473,991 | Wilson | May 3, 1892 |
| 1,454,465 | Becker et al. | May 8, 1923 |
| 1,837,158 | Colvin | Dec. 15, 1931 |
| 2,082,659 | Sauer | June 1, 1937 |
| 2,255,273 | Sauer | Sept. 9, 1941 |
| 2,511,937 | Netale | June 20, 1950 |
| 2,576,510 | Jansoone | Nov. 27, 1951 |
| 2,644,076 | Keegan | June 30, 1953 |

FOREIGN PATENTS

| | | |
|---|---|---|
| 807,477 | Germany | June 28, 1951 |